United States Patent [19]

Hagin et al.

[11] Patent Number: 4,976,665
[45] Date of Patent: Dec. 11, 1990

[54] VEHICLE DRIVE DEVICE WITH A HYDROSTATIC-MECHANICAL POWER SPLITTING TRANSMISSION

[75] Inventors: Faust Hagin, Munich; Helmut Flenker, Zorneding, both of Fed. Rep. of Germany

[73] Assignee: Man Nutzfahrzeuge AG, Munich, Fed. Rep. of Germany

[21] Appl. No.: 366,734

[22] Filed: Jun. 15, 1989

[30] Foreign Application Priority Data

Jun. 24, 1988 [DE] Fed. Rep. of Germany ....... 3821290

[51] Int. Cl.$^5$ ............................................. F16H 47/04
[52] U.S. Cl. ........................................ 475/80; 74/720
[58] Field of Search ................. 74/687, 793, 730, 720, 74/720.5; 475/73, 80, 84, 88, 218

[56] References Cited

U.S. PATENT DOCUMENTS

| | | | |
|---|---|---|---|
| 3,884,095 | 5/1975 | Miyao et al. | 74/687 |
| 3,897,697 | 8/1975 | Chambers et al. | 74/687 X |
| 3,969,958 | 7/1976 | Miyao et al. | 74/720.5 |
| 4,242,922 | 1/1981 | Baudoin | 74/687 |
| 4,313,351 | 2/1982 | Hagin | 74/687 |
| 4,420,991 | 12/1983 | Meyerle | 74/687 X |
| 4,446,756 | 5/1984 | Hagin et al. | 74/720.5 X |
| 4,754,664 | 7/1988 | Dick | 74/687 |
| 4,815,334 | 3/1989 | Lexen | 74/687 X |
| 4,843,907 | 7/1989 | Hagin et al. | 74/720 X |

Primary Examiner—Leslie A. Braun
Assistant Examiner—Benjamin Levi
Attorney, Agent, or Firm—Ladas & Parry

[57] ABSTRACT

In the case of hydromechanical power splitting transmission for vehicles the aim of the invention is to make possible the use of the same type of hydrostatic machine is hitherto and of an identical or similar four-shaft planetary differential transmission while at the same time expanding the effective range of conversion to cover substantially at least twice the range. This is achieved in that the hydromechanical power splitting transmission is designed for an extremely wide overdrive operation with a speed of rotation ratio (noutput: ninput of the two main shafts) of up to a maximum of 2. This is achieved by the addition of simple gear trains and the additional provision of clutches. Control devices are provided to so act on these additional clutches so that on transition from the second to at least one further operational range leading to the overdrive range, disengagement of one clutch disconnects the first hydrostatic machine (which has heretofore been connected with the annulus of the planetary differential transmission) and by engaging a further clutch at sync speed it is connected with one of the two main shafts of the power splitting differential transmission.

17 Claims, 3 Drawing Sheets

VEHICLE DRIVE DEVICE WITH A HYDROSTATIC-MECHANICAL POWER SPLITTING TRANSMISSION

BACKGROUND OF THE INVENTION

The invention relates to a vehicle drive device with a hydrostatic mechanical power splitting transmission between a drive prime mover and a driven mechanism—for instance a vehicle axle drive train—comprising a planetary differential transmission including at least two groups of planet wheels meshing with two sun wheels and at least four drive shafts, a web, and at least one annulus, two of these shaft corresponding to two main shafts of the transmission, namely an input shaft and an output shaft, further at least two variable displacement hydrostatic machines of the swash plate or bent axle type adapted to operate as a pump and as a motor, and in at least one operational range are connected to its respective shaft of the planetary differential transmission, such respective shaft being a shaft different from the main shafts, a transition from a first operational range to a second one taking place when the speed of a first given one of the hydrostatic machines drops to substantially zero, the second of the hydraulic machines then being switched over by means of clutches from the said output shaft to its own shaft through at least one of said sun wheels.

A drive device with these features has been proposed in U.S. Pat. No. 4,313,351. In the case of vehicle drives designed on this basis use was made of a hydromechanical power splitting transmission with two variable displacement hydrostatic machines able to be operated as motors or pumps, each one of which was able to transmit a rated power of about ⅔ from the power of the drive prime mover. This drive arrangement makes it possible to attain an approximately 5-fold increase in torque between the drive prime mover and the axle drive train.

This known design makes possible operation in a broad overdrive range but only when the speed of the drive prime mover and of the output of the drive is low and at the sacrifice of an increase in reactive power taking place as from a speed ratio of $N_{output}:N_{input}$ greater than approximately 1.5, that is to say with a decrease in efficiency. The latter feature is more especially a disadvantage in the case of use of the drive device in a car owing to the wide range of speed of rotation of the drive engine used therein.

In some applications the above-mentioned increase in torque of a factor of 5 is not sufficient in order to achieve a sufficient overall conversion range. In the case of very heavy tracklaying or wheeled vehicles a sufficient overall conversion range would only be on the basis of an increase in torque by a factor of 10 at full engine power. This problem has been able to be remedied so far by the use, for instance, of high power hydrostatic machines. SUch larger hydrostatic machines would however not only increase the overall size of the power splitting transmission, but also would involve redesigning hydraulic system parts such as power lines, control means, valves and the like so as to be suitable for a higher flow rate and an increased power, something that would obviously lead to a substantial increase in the initial price of such a power splitting transmission. Furthermore there is usually not sufficient space for such redesign to be effected.

BRIEF SUMMARY OF THE INVENTION

Accordingly one object of the invention is to improve a drive device of the initially mentioned type so that despite the employment of hydrostatic machines which are capable of handling the same power and of the same four shaft planetary differential transmission as in the past it is possible to achieve an increase in the size of the overdrive range at least without a compulsory reduction in the output speed of the hydromechanical power splitting transmission in the case of an increase in the $N_{output}:N_{input}$ speed ratio and while avoiding or at least reducing the hydrostatic power at the end of the overdrive range.

In the order to achieve these other objects appearing in the present specification, claims and drawings, the hydrostatic-mechanical power splitting transmission, which is capable of operation at an $N_{output}:N_{input}$ ratio of the main shafts greater than approximately 1.5, comprises means including clutches which, on transition from a second operational range in which the said speed ratio is greater than approximately 0.5 to at least one further operational range leading to the overdrive range, disconnects at sync speed said first hydrostatic machine from its instantaneous drive connection and couples it with one of the said main shafts.

Basically the power splitting transmission is improved by the addition of simple gear chains and clutches in order to achieve an extremely wide overdrive range with a speed ratio between the main shafts on the output and the input sides of up to approximately 2. Automatic control means are adopted in order to act on the thus designed power splitting transmission so that he hydrostatic machine which is connected in the first and second operational range with the annulus of the planetary differential via the clutch SK3 (see below), on changing over from the second operational range to at least one operational range leading into the overdrive range is disconnected by operation of clutches (SK3, SK4 and SK5, see below) from its actual drive connection and at sync speed is drivingly connected with one of the two mains shafts, that is to say either with the input or the output main shaft.

Preferably the operational range extending into the overdrive range is divided into two specific range regions so that there is a third operational range with an $N_{output}:N_{input}$ speed range between approximately 0.8 and approximately 1.4 and a fourth $N_{output}:N_{input}$ speed range between approximately 1.5 and approximately 2.

If the drive device of the invention is used in a very heavy tracklaying or wheeled vehicle, it is convenient to disconnect the said hydrostatic machine drivingly from the annulus of the planetary differential transmission on transition from the second to the third operational range and to connect it with the input main shaft of the power splitting transmission. Given a constant maximum speed of the drive prime mover and a constant speed of the hydrostatic machine connected with the input main shaft and given a decreasing speed of the other hydrostatic machine operating as a pump, it is thus possible for the speed of the output main shaft of the power splitting transmission to be increased into the overdrive range. This increase in the speed of the output may be continued as far as the desired factor of 2 after changing over from the third to the fourth operational range, the previously specified manner of operation of the two hydrostatic machines after changing over from the third to the fourth operational range, that is to say from the motor to the pump function or vice versa. At the instant of connecting the said given hydrostatic machine with the input main shaft there is an increase in the hydrostatic fraction of the power from initially approximately 30% to approximately 60%. This reactive power is however of no significance, since it only occurs for a very short period of time, for after this clutch operation another limit is reached, that is to say when the hydrostatic machine connected with input main shaft has reached a "zero" wobble or swash plate angle and the other hydrostatic machine is set at the maximum wobble angle.

If the drive device in accordance with the invention is used in a private car, then unlike the case of very heavy vehicles it is more expedient to disconnect the said hydrostatic machine drivingly from the annulus of the planetary differential transmission and to connect it with the output main shaft of the power splitting transmission. This leads to the advantage that no reactive power is produced in the third operational range and the hydrostatic fraction of the overall power is only increased to an amount less than 50%. This will only be changed on transition from the third to the fourth operational range, in which the hydrostatic fraction of the overall power is greater and thus would take the form of reactive power. In the case of private cars operation in this extremely high overdrive range is usually extremely infrequent so that the possible shortcomings in this operational range are hardly of any practical significance.

Inherently the ideal condition may be attained with a power splitting transmission such that the advantage of the speed changing action in the case of application to a private car are attained in the third operational range and the advantages of the speed changing action are achieved in the case of heavy vehicles in the fourth operational range with a combination of the advantage so that the respective disadvantageous reactive power ranges are fully eliminated. According to one way of achieving such an advantage:

(a) upon the transition from the second to the third operational range by using a clutch (SK3) there is a disconnection from the annulus of the planetary differential transmission and connection with the output main shaft of the power splitting transmission and this state is maintained until the end of the third operational range and (b) on transition from the third to the fourth operational range the clutch SK5 is again used to disconnect from the output main shaft and a connection is produced by way of a clutch SK4 with the input main shaft this state then being maintained till the end of the fourth operational range.

According to another way of effecting the same general objective, the said hydrostatic machine is so used that:

(a) upon transition from the second to the third operational range the clutch SK3 causes disconnection of the said machine from the annulus of the planetary differential transmission and the clutch SK5 is used to produce a connection with the output main shaft of the power splitting transmission, (b) prior to the reversal of the direction of rotation of the second hydrostatic machine, the clutch SK5 again causes disconnection of the said machine from the output main shaft and the clutch SK4 causes connection with the input main shaft whereby operation takes place in a fourth operational range, and (c) after reversal of the direction of rotation of the second hydrostatic machine in a final, fifth operational range the clutch SK4 is used to maintain the connection of the said machine with the input main shaft until the end of the overall conversion range.

These two possible designs are optimum from the point of view of function and performance, but they do suffer from the shortcoming that they are still based on the use of an expensive power splitting transmission which is bulky owing to the five clutches and additional gear trains.

However in the case of mass production these disadvantages may be minimized and are substantially outweighed by the advantages in effectiveness.

The following is a detailed description of the drive device of the invention by way of example only with reference to the accompanying drawings.

DETAILED DESCRIPTION OF THE EMBODIMENTS OF THE INVENTION

Figure 1:
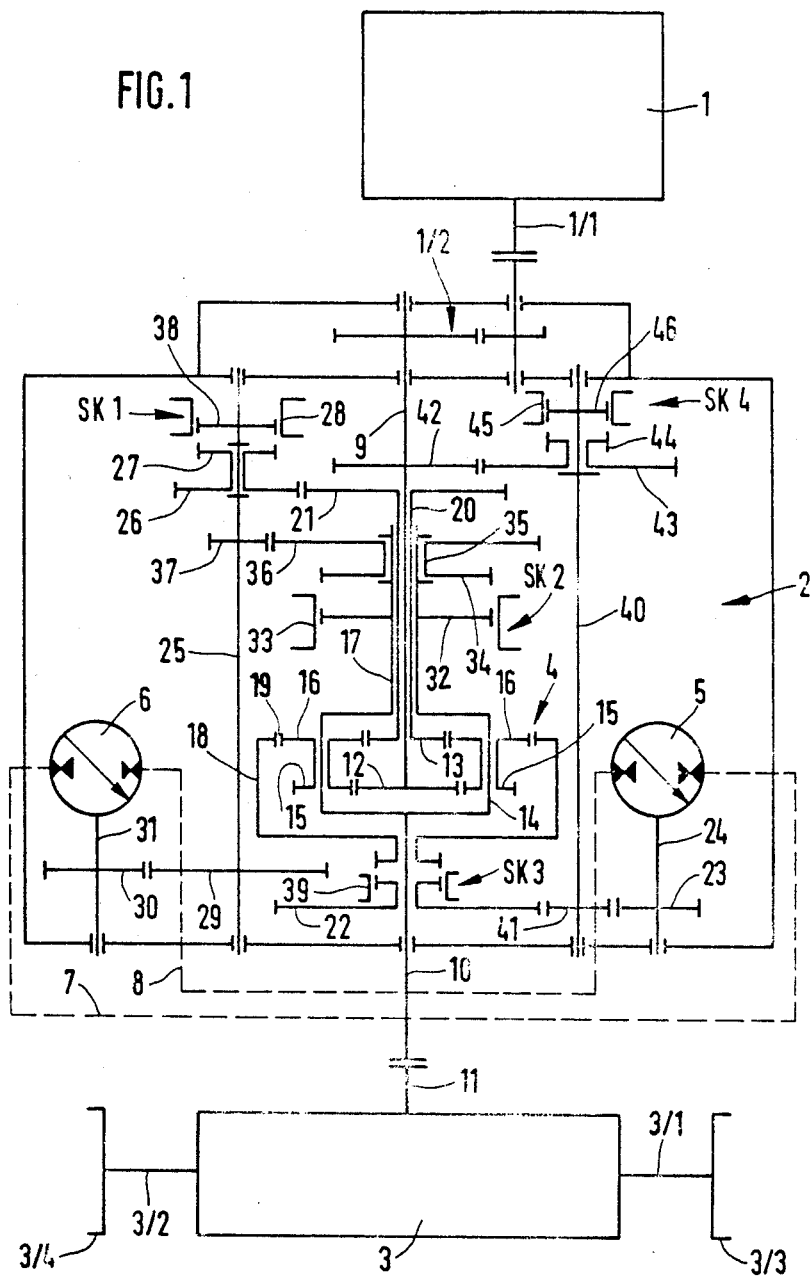
FIG. 1 diagrammatically illustrates one embodiment of the drive device of the invention which is particularly suitable for very heavy tracklaying or wheeled vehicles.

In the figures like reference numerals are used to denote like parts.

In FIG. 1 it will be seen that the drive device of a vehicle includes a drive prime mover 1, as for instance a diesel engine, a hydrostatic-mechanical power splitting transmission 2, a distributing and/or steering transmission 3, axles 3/1 and 3/2 extending from the two sides of the transmission 3 and drive wheels 3/3 and 3/4, respectively, connected with the latter. The drive wheels in this case are the drive sprockets of a tracklaying vehicle or the road wheels of a wheeled vehicle. The power splitting transmission 2 includes a planetary differential transmission 4 and at least two hydrostatic machines 5 and 6, which are in the form of adjustable hydromachines, which may each by operated as a motor or as a pump and which are connected with each other via hydraulic lines 7 and 8.

There is furthermore an input main shaft 9 and an output main shaft 10 of the power splitting transmission 2. The input main shaft 9 may either be coupled directly with the crankshaft 1/1 or, as is indicated in the figures, via a step-down transmission 1/2 with the crankshaft 1/1 of the drive engine 1. The output main shaft 10 is connected with the connecting shaft 11 leading to the distribution and/or steering transmission 3. The step-down transmission 1/2 serves to avoid excessively high speeds of rotation in the power splitting transmission 2.

In the illustrated form of the invention the planetary differential transmission 4 comprises a large sun wheel 12 fixedly keyed on the input main shaft 9, a small sun wheel 13, a plurality of double planet wheels 15 and 16 rotatably carried on a web 14, which is keyed to the output main shaft 10, a hollow shaft 17 fixed coaxially to the web 14 and an annulus 18. The latter has internal gear teeth 19, which are in mesh with the teeth of the planet wheels 16. The small sun wheel 13 is keyed on a hollow shaft 20, which is rotatable supported by bearings on the input main shaft 9 and furthermore carries a gear wheel 21 fixedly connected with it and rotatably supports the hollow shaft 17.

The device further includes a clutch SK3 having a clutch member 39 adapted to provide connection and disconnection between the annulus 18 and a gear wheel 22. Together with a gear wheel 41 keyed on a supplementary shaft 40 and a gear wheel 23 (keyed on the power of hydrostatic machine 5, the gear wheel 22 forms a drive connection with the hydrostatic machine 5. The speed of rotation of the output main shaft 10 is the result of summation of the speeds of rotation of the larger sun wheel 12 and of the annulus 18, which determine the speeds of rotation of the planet wheels 25 and of the web 14. Thus when the clutch SK3 is engaged the hydrostatic machine 5, acting via the gear wheels 23, 41 and 22, dictates the speed and direction of rotation of the annulus 18.

The gear wheel 21 keyed on the hollow shaft 20 is in mesh with a gear wheel 26 which is held on a further supplementary shaft 25 so that while being able to rotate thereon it is not able to move axially on it. The gear wheel 26 carries an entraining disk 27 and by means of an axially shifting clutch member 28 of a clutch SK1 the disk 27 is able to be connected and disconnected with the supplementary shaft 25. The latter may directly produce the mechanical connection between the planetary differential transmission 4 and the hydrostatic machine 6, in which case the latter would have its power shaft 31 directly connected with the supplementary shaft 25 in the illustrated example of the invention there is an indirect connection, since the supplementary shaft 25 carries a gear wheel 29 keyed on it, which as part of a transmission change speed means connected with the hydrostatic machine 6 is in mesh with a gear wheel 30, which is keyed on shaft 31 producing a mechanical connection with the hydrostatic machine 6.

The hydrostatic machine 6 is able to be connected via two different sets of transmission change speed means selectively with the output main shaft 10 or with the small sun wheel 13. One such connection is produced, as already mentioned, from the hollow shaft 20 with the gear wheel 21 via the gear wheel 26 and the clutch SK1 to the supplementary shaft 25 which in turn is connected with the gear train 29 and 30. The other of two possible transmission change speed means is due to the fact that the hollow shaft 17, which is keyed to the web 14, has an entraining wheel 32 keyed on it and the hollow shaft 17 has a clutch member 33, forming part of a clutch SK2 and able to be moved axially between a neutral position and a drive transmitting position. In the drive transmitting position the entraining wheel 32 is connected via the clutch member 33 of the clutch SK2 with an entraining wheel 34, which is connected via a hub 35 rotatably supported on the hollow shaft 17) in a fixed manner with a gear wheel 36, which in turn is in mesh with a gear wheel 37 keyed on the supplementary shaft 25. The ratio between the gear wheels 37 and 36 is for instance 1:4.5 and is larger than the ratio, equal for instance to 1:1.5, between the gear wheels 26 and 21.

The above mentioned first transmission change speed means between the output main shaft 10 and the hydrostatic machine 6 becomes effective in a first operational range of the vehicle, in which a speed ratio between the output main shaft 10 and the input main shaft 9 (i.e. $N_{output}:N_{input}$) of less than approximately 5% is produced. In this case the clutch member 33 of the clutch SK2 is engaged with the entraining wheel 34, that is to say the clutch SK2 is engaged. As a result the hydrostatic machine 6 is connected via the shaft 31, the gear wheels 30 and 29, the supplementary shaft 25 and the gear wheels 37 and 36 with the hollow shaft 17 and thus with the web 14 of the planetary differential transmission 4. The hydrostatic machine 5 in this case, in which the direction of rotation of the hollow wheel 18 is opposite to the direction of rotation of the large sun wheel 12 on the engine side, operates as a pump and supplies converted power to the hydrostatic machine 6. The latter functions as a motor and drives the shaft 31 so that power is transmitted via the above mentioned gear train to the output main shaft 10.

At the end of this first operational range the speed of rotation of the hydrostatic machine 5 will have so far decreased that it will be more or less stationary. In this case practically the entire power of the drive prime mover 1 will be transmitted mechanically only by the planetary differential transmission 4 to the output main shaft 10 of the power splitting transmission 2. In this situation, if further acceleration of the vehicle is desired, transition to the second operational range will take place, in which the speed of rotation ratio between the output main shaft 10 and the input main shaft 9 (i.e. $N_{output}:N_{input}$) is equal to a value between approximately 50% and approximately 80%. This transition is caused by disengaging the clutch SK2, that is to say sliding the clutch member 33 into the neutral or non-driving position and engaging the clutch SK1 so that then the transmission speed change means between the small sun wheel 13 and the hydrostatic machine 6 will be in operation, the gear wheel 26 then being coupled with the supplementary shaft 25. The drive power of the hydrostatic machine 6, then operating as a pump, will be transmitted from the small sun wheel 13 via the hollow shaft 20, the gear wheels 21 and 26, the supplementary shaft 25, the gear wheels 29 and 30 and the shaft 31. In this record operation range the hydrostatic machine 5 thus operates as a motor with the same direction of turning of the annulus 18 of the large sun wheel 12 as previously. The hydrostatic machine 5 draws its power from the hydrostatic machine 6, operating as a pump, via the hydraulic connecting lines 7 and 8.

In accordance with the invention the power splitting transmission 2 is also designed for an extreme overdrive operation with an $N_{output}$ to $N_{input}$ speed ratio between the output main shaft 10 and the input main shaft 9 between approximately 1.5 and approximately 2.

Preferably this operational range extending into the overdrive range is subdivided into two range portions in such a manner that there is a third operational range in which $N_{output}$ to $N_{input}$ is between approximately 80% and approximately 140% and there is a fourth operational range in which this said ratio extends from approximately 140% to approximately 200%. The overdrive range may also be subdivided into three range.

The overdrive operation is made possible by the addition of relatively simple gear trains and clutches to arrive at the above-described design of the power splitting transmission.

As may be seen from FIG. 1, in this respect it may be a question of a gear wheel 42 keyed on the input main shaft 9 and a gear wheel 43 meshing with this gear wheel 42, such wheel 43 being able to rotate on the first supplementary shaft 40 while however being axially locked in relation thereto. Wheel 43 carried an entraining disk 44, via which wheel 45 may be coupled by the clutch member 45 of a clutch SK4 with the supplementary shaft 40. The clutch member 45 is able to be shifted axially on an entraining disk 46, which is arranged in a fixed manner on the supplementary shaft 40, out of the neutral position into coupling connection with the entraining disk 44 and back again. Such a drive device is more particularly suitable for applications to very heavy vehicles such as tracklaying vehicles.

Figure 2:
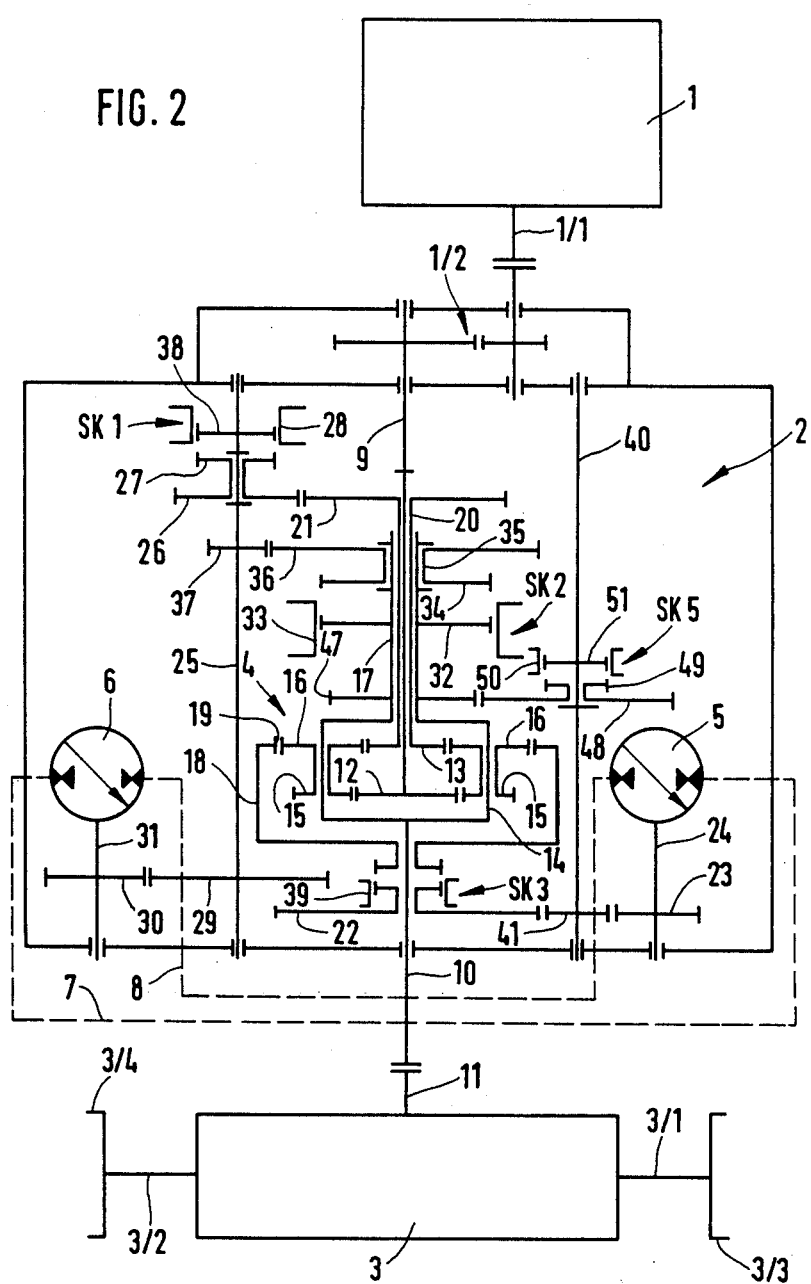
FIG. 2 diagrammatically illustrate of the drive device of the invention which is particularly suitable for private cars.

As will be seen from FIG. 2, the members of the overdrive system may also include a gearing means 47 rotating with the output main shaft 10 and a gear wheel 48 in mesh therewith and having a larger diameter. The wheel 48 is able to rotate on the first supplementary shaft 40 but is held from shifting axially thereon and it carries an entraining disk 49, via which is able to be coupled via the clutch member 50 of a clutch SK5 with the supplementary shaft 40. The gear member 47 may be a component of a gear wheel, which is fixedly secured to the hollow shaft 17, the web 14 or the output main shaft 10. The clutch member 50 of the clutch SK5 is arranged so that it is able to be moved axially on an entraining disk 51 (which is fixedly arranged on the supplementary shaft 40 from a neutral setting into a coupled condition with the entraining disk 49 and back again. This drive device is well suited to use in private cars.

Figure 3:
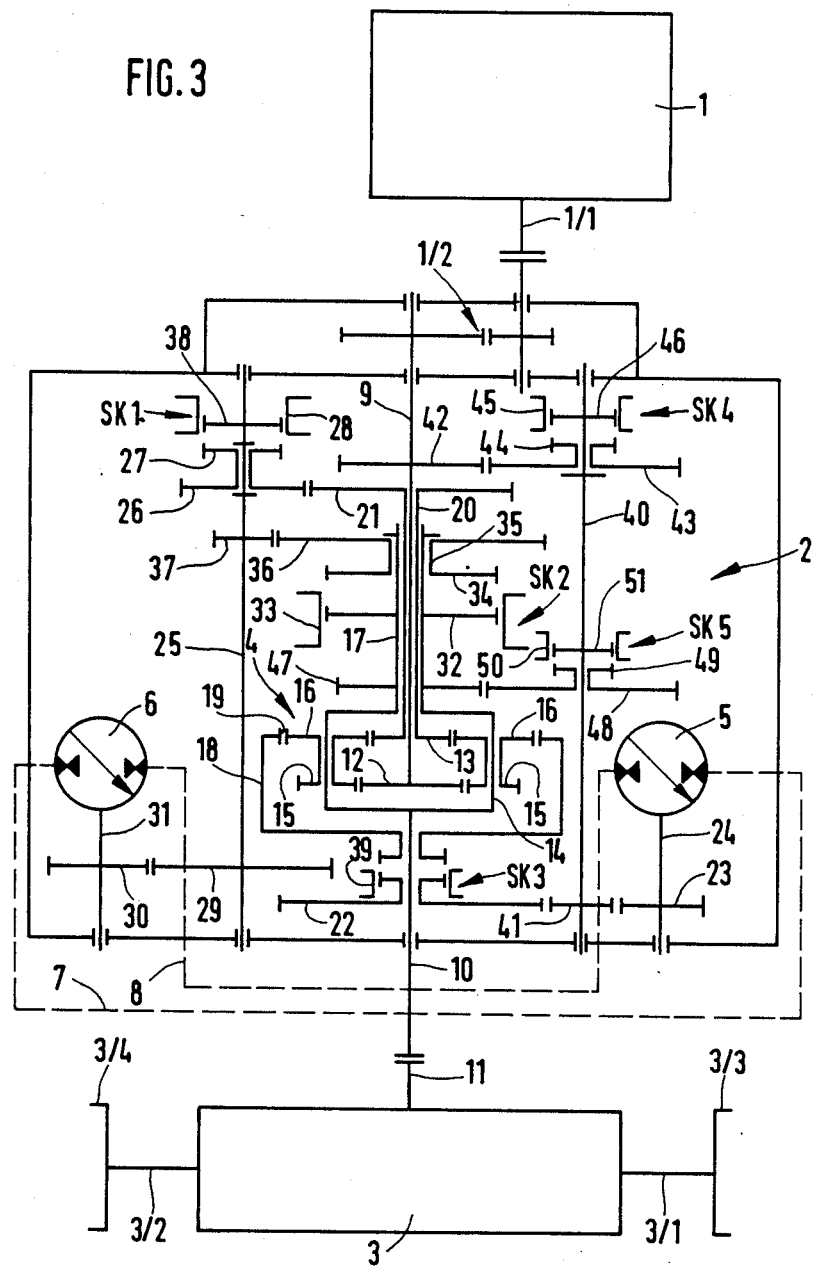
FIG. 3 diagrammatically illustrate the preferred form or best mode of the drive device in accordance with the invention.

As will be seen from FIG. 3, the overdrive system may also include a combination of the designs indicated in FIGS. 1 and 2. There are then a total of five clutches SK1, SK2, SK3, SK4 and SK5 and the drive device having the associated gear trains is the most suitable one and makes possible alternate connection of the hydrostatic machine 5:

(a) with the input main shaft 9 via the gear train 42, 43, 40, 41, 23 and 24, with clutch SK4 in the engaged state or (b) with the output main shaft 10 via the gear train 47, 48, 40, 41, 23 and 24 with the clutch SK5 in the engaged condition thereof.

The following part of the specification is devoted to the operations when changing over from the second operation range to the overdrive range.

If at the end of the second operational range the vehicle is to be further accelerated, then with the clutch SK1 still in the engaged state and the clutch SK2 in the disengaged state. The clutch SK3, which is generally kept engaged in the first and the second ranges, is disengaged and thus the hydrostatic machine 5 is disconnected from the annulus 18. At the same time or at an instant slightly before or after, the hydrostatic machine 5 is then connected as follows:

in the case as in FIG. 1 by engaging the clutch SK4 at sync speed with the input main shaft 9, in the case of FIGS. 2 and 3 by engaging the clutch SK5 at sync speed with the output main shaft 10.

At the instant of engagement of the clutch SK4 or, respectively, SK5, the two hydrostatic machines 5 and 6 are at the maximum angle, the speed of the hydrostatic machine 6 amounts to about ⅔ of the speed of the hydrostatic machine 5. The hydrostatic machine 6 operating as a pump in the second operational range continues to operate in the third operational range as a pump; the hydrostatic machine 5 operating as a motor in the second operational range operates in the third ranges also as a motor as was previously the case up till now. In the third operational range the hydrostatic machine 6 is constantly kept at the maximum angle, and the angle of the hydrostatic machine 5 is on the other hand reset to zero, the zero angle of the hydrostatic machine being achieved at the end of the third operational range.

In the case of FIG. 1 the connection of the hydrostatic machine 5 with the input main shaft 9 and thus its direct connection with the drive prime mover (circumventing the planetary differential transmission 4) means that there is a rapid increase in the hydrostatic part of the power from a previous value of 30% to approximately 60% of the overall power. This reactive power is however of hardly any consequence, because in a relatively short time a new limit point is reached at the end of the third operational range. On transition from the third range to the fourth range ($N_{output}$ to $N_{input}$ from approximately 140% to approximately 200%) the manner of operation of the two hydrostatic machines 5 and 6 is in fact changed over by hydrostatic switching, that is to say, in the fourth range the hydrostatic machine 6 then operates as a motor and the hydrostatic machine 5 then operates as a pump. The point of switching over from the third to the fourth operational range is characterized by a stationary condition of the small sun wheel 13, because in this case it no longer possible for hydrostatic power to be transmitted from the hydrostatic machine 5 to the hydrostatic machine 6. Owing to the increase in the angle of the hydrostatic machine 5 the speed of the hydrostatic machine 6 is subsequently increased, this in turn leading to a corresponding increase in the speed of the output main shaft 10. At the end of this fourth operational range the speeds of rotation will be as follows:

the annulus 18 idling without there being any load will turn at three times the speed of the input main shaft, the web 14, and with it the output main shaft 10, will rotate at twice the speed of the input main shaft 9.

In this fourth operational range there will be no hydrostatic reactive power, since the proportion of the hydrostatic power as a fraction of the overall power of the power splitting transmission 2 is comparatively small and at the end of the fourth operational range will be about 33%.

In the case of FIG. 2 the connection of the hydrostatic machine 5 with the output main shaft 10, unlike the case of FIG. 1, means that during operation within the third range there is no hydrostatic reactive power, as the fraction of the hydrostatic power of the overall power of the power splitting transmission 2 generally remains under 50% until the end of the third operational range, despite the increase. The situation is however changed after the transition from the third to the fourth operational range ($N_{output}:N_{input}$ between approximately 140% and approximately 200%), because then after reaching the switch-over point, which here as well as in the case of FIG. 1 is characterized by the stopping of the small sun wheel 13 and concerns the condition in which it is not possible for any further hydrostatic power to be transmitted to the hydrostatic machine 6, the direction of rotation of the hydrostatic machine 6 is reversed, the latter then functions as a motor and receives its driving power from the hydrostatic machine 5 which now serves as a pump. As a result there is necessarily an increase in the hydrostatic power fraction of the overall power of the power splitting transmission 2 to a value of approximately 60% at the end of the fourth operational range.

The embodiment in the invention of FIG. 2 is accordingly excellently suited for vehicles which are frequently driven in the third operational range, i.e. the lower overdrive range and are little used in the upper overdrive range.

The preferred embodiment of the invention which practically makes it possible to avoid hydrostatic reactive power is accordingly the design of FIG. 3, which unites the additional transmission and clutch means of the two designs of FIGS. 1 and 2. The occurrence of reactive power accordingly may be avoided by a first method by the following control means acting on the transmission of FIG. 3, namely:

(a) on transition from the second to the third operational range (at $N_{output}:N_{input}$ equal to approximately 80% to approximately 140%) after disengagement of the clutch SK3 the hydrostatic machine 5 is connected by engaging the clutch SK5 with the output main shaft 10, this condition being maintained until the end of the third operational range and causing an action of the system much like that of FIG. 2, and (b) on transition from the third to the fourth operational range $N_{output}:N_{input}$ equal to between approximately 140% and approximately 200%) the clutch SK5 is disengaged again and the clutch SK4 is engaged and thus the hydrostatic machine 5 is disconnected from the output main shaft 10 and then drivingly connected with the input main shaft 9, this condition being maintained till the end of the fourth operational range and causing operation much like that in the case of FIG. 1.

The operation with hydrostatic reactive power may be furthermore avoided in accordance with a further second method by the following manner of operating the transmission of FIG. 3, namely:

(a) on transition from the second to the third operational range ($N_{output}:N_{input}$ after disengaging the clutch SK3 the hydrostatic machine 5 is connected with the output main shaft 10 by engaging the clutch SK5 and this condition is maintained to until a range is reached prior to the reversal in the direction of rotation of the hydrostatic machine 6 and brings about a state similar to that of FIG. 2, (b) in a certain range prior to the reversal in the direction of rotation of the hydrostatic machine 6 the other hydrostatic machine 5 is disconnected again from the output main shaft 10 by disengaging the clutch SK5 and by engaging the clutch SK4 hydrostatic machine 5 is connected with the input main shaft 9, this condition involving operation in a fourth range in which $n'output:N_{input}$ is between approximately 110% and approximately 140%, and (c) after reversal in the direction of rotation of the hydrostatic machine 6 the other hydrostatic machine 5 is kept connected with the input main shaft 9 via the clutch SK4 (which is still kept engaged) until the end of the overall conversion range, this state involving operation like that of FIG. 1.

The drive device of FIG. 3 is thus of general application and may be used with particular advantage in the case of all those vehicles, which are heavily used and are operated in the full overdrive range.

We claim:

1. A vehicle drive device comprising a hydrostatic mechanical power transmission between a prime mover and a driven mechanism, said power transmission comprising:

an input shaft drivingly coupled to the prime mover,
an output shaft drivingly coupled to the driven mechanism,
a planetary differential transmission connecting said input shaft and said output shaft for drive in three operational ranges, in which in the first operational range the ratio of the rotational speed of the output to the input shafts is less than about 0.5, in the second operational range the speed ratio is between about 0.5 and 0.8 and in the third operational range said speed ratio is greater than about 0.8,
said planetary differential transmission comprising first and second sun wheels, the first sun wheel being fast with the input shaft,
first and second groups of planet wheels respectively in mesh with said first and second sun wheels,
two further drive shafts, one of which is connected to said second sun wheel,
a web connected to said output shaft and to the other of said further drive shafts, and
an radially annulus supporting said planet wheels,
first and second hydrostatic machines, each operable as a pump and a motor and hydraulically connected so that when one machine operates as a pump it drives the other as a motor and vice-versa, said first and second hydrostatic machines having respective power shafts, first and second supplementary shafts drivingly coupled to respective power shafts of said first and second hydrostatic machines,
gear trains on each supplementary shaft, and clutch means for selective connecting said gear trains to said annulus, said web and said input shaft and said further drive shafts to provide transition between said operational ranges, and upon transition to said third operational range to disconnect at sync speed the first hydrostatic machine from a drive connection with the differential transmission via said annulus and respective power shaft and provide a drive connection selectively with one of said input and output shafts to the differential transmission.

2. A vehicle drive device as claimed in claim 1 wherein in a first portion of said third operational range said first hydrostatic machine is drivingly connected by said clutch means to said output shaft via the other of said further drive shafts and said web.

3. A vehicle drive device as claimed in claim 2 wherein in a second portion of said third operational range in which said speed ratio is higher than in said first portion, said first hydrostatic machine is drivingly connected by said clutch means to said input shaft.

4. A vehicle drive device as claimed in claim 3 wherein in said first portion of the third operational range said speed ratio is between 0.8 and 1.4 and in said second portion of the third operational range said ratio is greater than 1.5.

5. A vehicle drive device as claimed in claim 3 comprising a step-down gearing connecting the prime mover and said input shaft.

6. A vehicle drive device as claimed in claim 2 wherein in the transition from the second to the third operational range, said clutch means disconnects said first hydrostatic machine from said annulus and connects said first hydrostatic machine to said output shaft via the other further drive shaft and said web and in a second portion of the third operational range in which the speed ratio is higher than that in said first portion, said clutch means disconnects said first hydrostatic machine from said output shaft and connects the first hydrostatic machine to said input shaft.

7. A vehicle drive device as claimed in claim 6, wherein said clutch means includes a first clutch, a second clutch, a third clutch which disconnects said first hydrostatic machine from said annulus in the transition from the second to the third operational range, a fourth clutch which connects said first hydrostatic machine to said input shaft in the transition from the second to the third operational range, and a fifth clutch which connects said first hydrostatic machine to said output shaft via the other of said further drive shafts and said web in the transition from the second to the third operational range.

8. A vehicle drive device as claimed in claim 6 wherein said second hydrostatic machine is reversed in direction of rotation after the first hydrostatic machine is connected to said input shaft.

9. A vehicle drive device as claimed in claim 6 wherein said second hydrostatic machine is reversed in direction of rotation concurrently as said clutch means is operated in said second portion of the third operational stage to disconnect said first hydrostatic machine from said output shaft and connect it to said input shaft.

10. A vehicle drive device as claimed in claim 1 wherein in the transition from the second operational range to the third operational range, said clutch means disconnects said first hydrostatic machine from said annulus and connects said first hydrostatic machine to said output shaft via the other of said further drive shafts and said web.

11. A vehicle drive device as claimed in claim 10 wherein said third operational range includes first and second portions, and in a transition from said first to said second portion, said second hydrostatic machine is reversed in direction of rotation and said first hydrostatic machine is switched over from a motor function to a pump function.

12. A vehicle drive device as claimed in claim 1, wherein said clutch means includes a first clutch for selective connection of said second supplementary shaft to said one further drive shaft, a second clutch for selective connection of said second supplementary shaft to said other further drive shaft, and a third clutch for selective connection of said first supplementary shaft to said annulus.

13. A vehicle drive device as claimed in claim 12 wherein said clutch means further includes a fourth clutch for selective connection of said first supplementary shaft to said input shaft.

14. A vehicle drive device as claimed in claim 12, wherein said clutch means further includes a fifth clutch for selective connection of said first supplementary shaft to said other further drive shaft.

15. A vehicle drive device as claimed in claim 12 wherein said clutch means further includes a fourth clutch for selective connection of said first supplementary shaft to said input shaft, and a fifth clutch for selective connection of said first supplementary shaft to said other further drive shaft.

16. A vehicle drive device as claimed in claim 1 wherein in the second and third operational ranges, said second hydrostatic machine operates as a pump and said first hydrostatic machine operates as a motor.

17. A vehicle drive device as claimed in claim 1, wherein in the transition from the second operational range to the third operational range, said clutch means disconnects said first hydrostatic machine from said annulus and connects said first hydrostatic machine to said input shaft.

* * * * *

UNITED STATES PATENT AND TRADEMARK OFFICE
CERTIFICATE OF CORRECTION

PATENT NO. : 4,976,665

DATED : December 11, 1990

INVENTOR(S) : Faust HAGIN and Helmut FLENKER

It is certified that error appears in the above-identified patent and that said Letters Patent is hereby corrected as shown below:

On the title page:

Item 73 - Correct the spelling of the Assignee name from:

"Man Nutzfahrzeuge AG, Munich" to

"MAN Nutzfahrzeuge A.G., Munich"

Signed and Sealed this

Twenty-seventh Day of April, 1993

*Attest:*

MICHAEL K. KIRK

*Attesting Officer*    Acting Commissioner of Patents and Trademarks